United States Patent [19]

Kittle

[11] Patent Number: 4,561,905
[45] Date of Patent: Dec. 31, 1985

[54] METHOD FOR SUPPRESSING COAL DUST

[75] Inventor: Paul A. Kittle, c/o Valerin Technologies Limited, 87 Great Valley Pkwy., Malvern, Pa. 19355

[73] Assignee: Paul A. Kittle, West Chester, Pa.

[21] Appl. No.: 632,724

[22] Filed: Jul. 20, 1984

[51] Int. Cl.⁴ ............................................. B08B 3/00
[52] U.S. Cl. ..................................... 134/25.1; 55/87; 55/385 D; 134/36; 252/88; 299/12
[58] Field of Search ................... 134/25.1, 36; 299/12; 252/88; 55/87, 1385 D

[56] References Cited

U.S. PATENT DOCUMENTS

| | | | |
|---|---|---|---|
| 943,667 | 12/1909 | Ellis | 252/88 |
| 2,621,115 | 12/1952 | Order | 252/88 X |
| 2,646,361 | 7/1953 | Rostler | 252/88 UX |
| 3,954,662 | 5/1976 | Salyer et al. | 252/88 X |
| 4,380,459 | 4/1983 | Netting | 55/87 |
| 4,400,220 | 8/1983 | Cole, Jr. | 134/18 |
| 4,417,992 | 11/1983 | Bhattacharyya et al. | 252/88 |

FOREIGN PATENT DOCUMENTS

| | | | |
|---|---|---|---|
| 50-40491 | 4/1975 | Japan | 252/88 |
| 602406 | 5/1948 | United Kingdom | 299/12 |

OTHER PUBLICATIONS

Salyer et al., *Foam Suppression of Respirable Coal Dust–Final Report*, Monsanto Research Corporation, 1970, pp. iii, 10, 40, 51–53.

*Primary Examiner*—Marc L. Caroff
*Attorney, Agent, or Firm*—Howson and Howson

[57] ABSTRACT

In suppressing coal dust by the application of a foam to a falling mass of coal, a continued dust suppression effect is achieved by foaming a water-diluted emulsion of water, a surfactant, and an oil which exhibits a tacky characteristic when in the form of a film in the absence of water at temperatures within the range from approximately 21° C. down to approximately −12° C.

3 Claims, 1 Drawing Figure

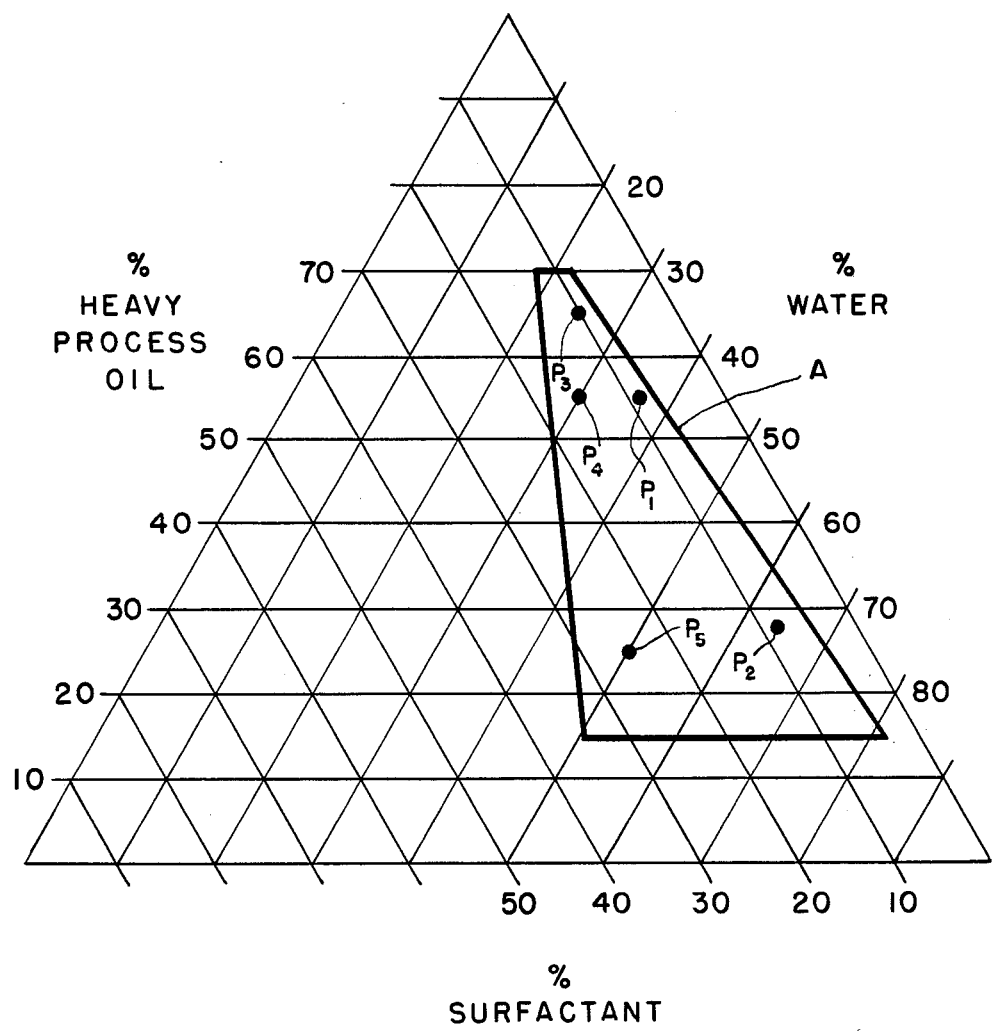

METHOD FOR SUPPRESSING COAL DUST

BRIEF SUMMARY OF THE INVENTION

This invention pertains to the suppression of coal dust, and more specifically to a composition which may be applied, in the form of a foam, to a falling mass of coal either at a mine face or at a conveyor transfer point. The composition differs from conventional foamable compositions used for this purpose in that it forms a coating on the coal which prevents the escape of dust at locations remote from the locations of foam application. The invention also relates to a method for suppressing the formation of coal dust at such remote locations.

The use of foam for the suppression of coal dust was described in 1970 in a report entitled "Foam Suppression of Respirable Coal Dust" by I. O. Salyer, and others, of Monsanto Research Corporation. This report was made to the U.S. Department of the Interior, Bureau of Mines pursuant to contract HO100179. For further background on foam suppression of coal dust, reference may be made to U.S. Pat. No. 4,400,220, to Howard W. Cole, Jr., dated Aug. 23, 1983. The Salyer et al. paper, and the Cole, Jr. patent both relate to the suppression of respirable coal dust by spraying a small cell foam into a falling mass of coal. The methods described by Salyer and Cole are effective in suppressing dust formation at the points where the foam is applied. However, the foam quickly dissipates, and its water evaporates so that the application of foam has no appreciable continuing effect. Thus, agitation of the mass of coal at a point remote from the foam application point can result in the release of dust. For example, if foam is applied at a first conveyor transfer point, but not at a second transfer point, significant quantities of dust may be released at the latter point, particularly if the lapse of time is sufficient to allow evaporation of the water content of the applied foam.

The principal object of this invention is to provide a composition which can be applied as a foam at the mine face or at a transfer point for initial suppression of coal dust, and which has a continuing effect such that, after the foam is applied, the release of dust at locations remote from the foam application points is significantly reduced.

It is a further object of the invention to reduce the need for dust suppression foaming apparatus at numerous transfer points and other points at which coal may be agitated in a mining or other coal-handling operation.

A still further object of the invention is to provide for the continued suppression of dust by the application to the coal of an agent which does not interfere with the burning of the coal, which is safely and easily used, which is relatively inexpensive, and which is stable in storage.

Further objects of the invention will be apparent from the following detailed description, when read in conjunction with the drawing.

BRIEF DESCRIPTION OF THE DRAWING

The single FIGURE is a triaxial diagram depicting the parameters of a three-component emulsion in accordance with the invention, and also depicting a number of specific examples thereof.

DETAILED DESCRIPTION

The composition in accordance with the invention is essentially a three-component mixture consisting of oil, water, and a surfactant. This mixture, which is in the form of an emulsion, is diluted and foamed. The foam is then sprayed into a falling mass of coal either at a mine face or at a transfer point. Preferably, but not necessarily, dilution and foaming take place substantially simultaneously, by the metering of the emulsion and water into a foaming apparatus into which air or another gas is introduced for the formation of bubbles.

The oil component of the emulsion has as its most important characteristic, a high degree of tackiness at temperatures in the range from at least 21° C. down to approximately −12° C. The reason for this is that the application of foam to the falling coal leaves a film of oil on the coal after evaporation of water. The tackiness of the film causes fine dust particles to adhere to the film rather than escape into the atmosphere when the coal is agitated during handling. The oil film can be, and preferably is, tacky at temperatures well in excess of +21° C.

Another important characteristic of the oil is that it should not be absorbable to any appreciable extent by the coal. Absorption would destroy the film.

The oils which are suitable for use in this invention may be generally described as "heavy process oils", and include asphalt cut-back, i.e. asphalt dissolved in a moderately heavy oil such as No. 3 fuel oil, residual fuel oils of relatively high viscosity such as No. 6 fuel oil, and various other oils as well. The preferred oils have a viscosity in the range of from approximately 600 to 7,000 SUS (Saybolt Universal Seconds) at 38° C., a pour point in the range of approximately −18° C. to 21° C., a molecular weight of at least approximately 300, and a boiling point of at least approximately 204° C. (The boiling point is a general indicator of volatility, and it is important that the oil be slow to evaporate.)

A preferred oil is "Hydrolene 90", a high viscosity, low volatility aromatic oil available from Sun Oil Company in Radnor, Pa. Hydrolene 90 is the last fraction distilled from crude oil before asphalt is left behind. It has the following properties:

|  | ASTM Method | Hydrolene 90 |
|---|---|---|
| Physical Properties | | |
| Viscosity, SUS/38° C. | D2161 | 3500 |
| Viscosity, SUS/98.9° C. | D2161 | 96.0 |
| API Gravity, 15.5° C. | D287 | 10.3 |
| Specific Gravity, 15.5° C. | D1250 | 0.998 |
| Viscosity-Gravity Constant | D2501 | 0.954 |
| Weight, kg./l. | D1250 | 0.996 |
| Molecular Weight | D2502 | 375 |
| Pour Point, °C. | D97 | +12.8 |
| Color 1% Dilute | D1500 | <1.5 |
| Volatility | D972 | 1.2 |
| % Wt. loss, 22 hr @ 107° C. | | |
| Flash Point, COC, °C. | D92 | 215.6 |
| Refractive Index | D1747 | 1.5684 |
| Aniline Point | D611 | 97 |
| Sulfur, Wt. % | D2622 | 2.8 |
| Chemical Properties | | |
| Clay-Gel, Wt. % | D2007 | |
| Asphaltenes | | 0.0 |
| Polar Compounds | | 10.4 |
| Aromatics | | 73.2 |
| Total Aromatics | | 83.6 |
| Saturates | | 16.4 |
| Carbon Type Analysis, % | D2140 | |
| Ca | | 37 |

|   | ASTM Method | Hydrolene 90 |
|---|---|---|
| Cn |   | 28 |
| Cp |   | 35 |

The heavy process oils just mentioned are usable in accordance with the invention because they exhibit the necessary or desirable characteristics outlined above, and because they are capable of forming, with water and surfactant, emulsions which are stable in storage. That is, the emulsions either do not separate out into their components, or, if separation does take place, the emulsion can readily be restored to a homogenous state by agitation. Ordinary asphalt will form emulsions, but they are not stable in storage. Once an asphalt emulsion has collapsed, two phases are formed which cannot be reconstituted without the application of heat to soften the asphalt followed by mixing with a high shear device.

The surfactant can be any one of a wide variety of anionic or cationic surfactants. Anionic surfactants are preferred because of their good foaming capabilities and low cost. Cationic surfactants are generally more expensive, and less desirable from a cost standpoint. Nonionic surfactants are not used as the primary surfactant in the emulsion of this invention because in general they do not provide sufficient quantities of foam. However, they may be present in comparatively small quantities along with anionic or cationic surfactants in order to enhance storage stability.

A preferred surfactant in accordance with the invention is an anionic surfactant known as "Biosoft D-40", available from Stepan Chemical Company of Northfield, Ill. Biosoft D-40 is sodium dodecylbenzene sulfonate in water solution containing approximately 37% actives.

The emulsion is preferably applied by diluting the oil-surfactant-water mixture with further quantities of water and introducing a gas, usually air, into the diluted mixture to form bubbles. This can be accomplished by the use of the foaming apparatus as described in the above-mentioned Salyer et al. report or the Cole, Jr. patent. Alternatively, foaming can be accomplished by the use of a foaming apparatus available from Valerin Technologies Limited of St. Louis, Mo., the assignee of this application. The Valerin foaming apparatus produces a foam by forcing a liquid/surfactant mixture through a restricted passage at a very high pressure and injecting air into the mixture downstream of the restriction. The restriction is sufficiently narrow to produce a high velocity flow of the liquid/surfactant mixture so that flashing takes place downstream of restriction for initiating generation of foam. Continued generation of foam takes place in a conveying line downstream of the restricted passage. When the Valerin apparatus is used for producing a foam in accordance with the present invention, the water-diluted emulsion is delivered under high pressure through the restricted orifice, and the foam, which is formed in the conveying line downstream of the orifice, is sprayed onto a falling mass of coal.

While the emulsion in accordance with the invention is stable in storage, dilution of the emulsion followed by injection of air into the diluted composition drastically destabilizes the system, leaving the oil component no alternative except to combine with itself to form a larger and larger mass, essentially undoing the emulsification step. When this foamed, dilute emulsion contacts a falling mass of coal, the oil has another alternative, namely to coat the coal rather than to combine with itself to form a larger and larger mass. Since the coal is present in much larger quantities than the oil, the oil is distributed on the coal. It remains on the surface of the coal as a tacky film after the water evaporates.

In the undiluted emulsion in accordance with the invention, the proportion of oil is preferably in the range of approximately 15 to 70% by weight, the proportion of surfactant is preferably in the range of approximately 4 to 35% by weight, and the proportion of water is in the range of approximately 18 to 81% by weight. The preferred range is depicted in the drawing, in which area A indicates a range of compositions which are practical for use in the suppression of coal dust by the application to falling coal of a heavy process oil-containing foam. The sloping line delimiting the righthand side of area A indicates the minimum practical proportion of surfactant. The percentage of surfactant refers to the percentage of concentrated surfactant. In the case of Biosoft D-40, which is 40% surfactant and 60% water, Biosoft D-40 must be present as 10% of the emulsion in order for the emulsion to contain 4% surfactant, as depicted in the diagram. As apparent from the diagram, the minimum quantity of surfactant ranges from approximately 4% to approximately 9%, depending on the quantity of oil present in the emulsion. More surfactant is needed as the quantity of oil increases. In general, the amount of surfactant present in the mixture will be kept at a minimum for economic reasons. However, there are reasons why increased quantities of surfactant might be used. For example, in the event that the water used is hard water, increased quantities of surfactant may be desirable. Additional quantities of surfactant may also be necessary for proper foaming when the dilution rate is high, i.e. when large quantities of diluting water are added to the emulsion either prior to or simultaneously with the foaming operation.

In general, viscosity of the emulsion increases with increasing proportions of heavy process oil. As a practical matter, 70% is an approximate upper limit on the quantity of oil in the emulsion. When this limit is exceeded, problems arise in handling the emulsion through conventional metering devices. In general, the proportion of heavy process oil in the emulsion should be as high as possible consistent with viscosity considerations. However, lower proportions of heavy process oil may be desirable where a low treatment rate is important, i.e. when the coal is to be coated with a very light film of oil. The reason for using a mixture having a comparatively low proportion of oil in this type of application is that the use of a mixture having a high concentration of oil may require operation of the metering device at so slow a rate as to produce non-uniform application of oil to the coal.

It is not considered practical to use mixtures containing less than approximately 15% heavy process oil.

The nearly vertical line delimiting the area A at the left defines a range of compositions consisting of oil and Biosoft D-40, with no added water. It is possible to make usable compositions which fall to the left of this line using concentrated surfactants. However, it is not practical to do so, as concentrated surfactants are much more expensive, and it is neither necessary nor economical to use such large quantities of surfactant.

In general, the application rate of an emulsion which, in undiluted form, contains 55% heavy process oil, will fall in the range from approximately 0.003 to 0.1 gallons of emulsion per ton of coal. This range would be of course adjusted proportionately if the emulsion contained a proportion of oil other than 55%. The upper end of the range is desirable in extremely dusty situations. Typically, the application rate for an emulsion containing 55% heavy process oil is 0.01 gallons per ton.

The dilution ratio, i.e. the ratio of the quantity of added water to the quantity of emulsion, is independent of the composition of the emulsion. The dilution ratio can range from as little as 5:1 to as much as 40:1, but is preferably in the range from about 10:1 to 30:1. A typical dilution ratio is 20:1, which falls in the middle of the preferred range.

The following are examples of emulsion compositions falling within the range depicted in the drawing.

EXAMPLE 1

The preferred composition is an emulsion consisting of 55% by weight "Hydrolene 90", 21.2% by weight Biosoft D-40 and 23.8% water. As Biosoft D-40 is 60% water, this translates to 55% Hydrolene 90, 36.5% water and 8.5% surfactant. This composition is represented by point $P_1$ in the drawing, and is considered optimum from the standpoint of emulsion stability, cost, ease of handling, usability under adverse temperature conditions and versatility.

EXAMPLE 2

Another composition is an emulsion consisting of 28% by weight of "Hydrolene 90", 64% by weight of water and 8% by weight of surfactant (based on the solids component of "Biosoft D-40"). This composition is represented by point $P_2$ in the drawing. While it is stable in the form of an emulsion, it is economically less desirable than the composition of Example 1. About twice as much of this composition is needed to apply the same amount of oil as is appllied by a given quantity of the composition of Example 1. Consequently for a given amount of oil, shipping costs are increased with this example. The emulsion of Example 2 is useful, however, in situations in which a low treatment rate is desired, such as where the coal is to be used for purposes other than burning. Since the percentage of oil in the emulsion is relatively low, the coal can receive a relatively light coating of oil, while the emulsion is supplied through a metering device at a rate sufficient to insure uniform application.

EXAMPLE 3

Another composition which is capable of performing satisfactorily under most conditions consists of 65% by weight of "Hydrolene 90", 25% by weight of water and 10% by weight of surfactant (based on the solids component of "Biosoft D-40"). This composition is represented by point $P_3$ in the drawing. The emulsion has a high oil content, and is satisfactory for most applications. However, it has a tendency to separate unless it is agitated. Furthermore, its viscosity is too high for use in very cold weather.

EXAMPLE 4

An emulsion consisting of 55% by weight of "Hydrolene 90", 30% by weight of water and 15% by weight of surfactant (based on the solids component of "Biosoft D-40") is represented by point $P_4$ in the drawing. This emulsion contains a comparatively high quantity of surfactant and is useful where the available water is hard, for example in the case where the water is derived from the ash pond of a coal burning utility. It is also useful where the dilution ratio is high, e.g. 35:1, in order to insure that proper foaming takes place.

EXAMPLE 5

An emulsion consisting of 25% by weight of "Hydrolene 90", 50% by weight of water and 25% by weight of surfactant (based on the solids component of "Biosoft D-40") is represented by point $P_5$ in the drawing. This emulsion is stable and capable of suppressing dust satisfactorily, as are all of the other emulsions within area A. However, its oil content is too low and its surfactant content too high for it to be cost-effective in presently contemplated applications.

Storage stability of the emulsion can be improved without causing deterioration of other desired properties by the inclusion of a nonionic surfactant either in place of or in addition to the anionic or cationic surfactant. These nonionic materials increase the freeze-thaw stability of the emulsion as well as the shelf life stability. However, unfortunately they also tend to detract from the foaming ability in cold water, i.e. water below about 15° C. It is important that the emulsion be able to produce foam in water which is very near the freezing point. These modified mixtures can be used in special applications where low temperatures are not expected. A typical modified composition which is capable of being more stable than the preferred composition of Example 1 consists of 55% Hydrolene 90, 20% Biosoft D-40 and 6.7% Steol KS-460, an alkyl ether sulfate available from Stepan Chemical Company of Northfield, Ill., together with 18.3% water. Another modified composition, using a simple nonionic surfactant, consists of 55% Hydrolene 90, 20% Biosoft D-40, 4% triton X-100, a nonionic surfactant available from Rohm and Haas of Philadelphia, Pa., and 21% water. Both of these two compositions exhibit better storage stability than the emulsion of Example 1. However, they are not considered significantly superior to Example 1 except possibly in some very limited applications where low temperatures are not expected. In general, the emulsion of Example 1 exhibits adequate stability under most conditions, and to the extent that any separation takes place, it can easily be remedied by periodic or continuous circulation. Since the system for feeding the emulsion requires a pump in any event, it is easy to modify the system to use the pump to effect circulation of the emulsion.

In summary, the invention provides significant advantages over prior foam dust suppression systems by coating the coal with a tacky oil to produce a continued dust suppressing effect, and thereby reducing the requirements for numerous separate dust suppressing units in a coal handling operation. The invention also has the advantage that a single application of foam produces both conventional dust control at the point of application and continued dust control at remote locations.

I claim:

1. A method of suppressing coal dust comprising the steps of: diluting, with water, an emulsion comprising water, a surfactant and an oil in proportions in the range depicted by area A in the drawing, the oil exhibiting a tacky characteristic with respect to coal dust when in the form of a film in the absence of water and at temperatures above approximately −12° C. and up to at least approximately +21° C.; forming a foam of the diluted emulsion; and applying the foam to a falling mass of coal.

2. A method according to claim 1 in which the oil has a viscosity in the range of approximately 600 to 7000 SUS at 38° C., a pour point in the range of approximately −18° C. to 21° C., a molecular weight of at least approximately 300, and a boiling point of at least approximately 204° C.

3. A method according to claim 1 in which the amount of water added to the emulsion in the diluting step is such as to produce a dilution ratio of water to emulsion in the range from 5:1 to 40:1.

* * * * *